UNITED STATES PATENT OFFICE 2,683,696

N, N' DINITROSO DIURETHAN BLOWING AGENTS

Erwin Müller, Leverkusen-Bayerwerk, Siegfried Petersen, Leverkusen-Schlebusch, and Friedrich Löblein, Bergisch-Gladbach, Germany, assignors to Farbenfabriken Bayer Aktiengesellschaft, Leverkusen, Germany, a corporation of Germany No Drawing. Application October 25, 1949,
Serial No. 123,536

Claims priority, application Germany
April 8, 1949

8 Claims. (Cl. 260—2.5)

The present invention relates to a novel process for producing high-grade spongy materials from high molecular plastics.

It is an object of the present invention to provide sponge products of improved properties.

It is a further object of the invention to provide sponge products of uniform cell structure, finest texture and excellent softness.

It is another object of the invention to provide a class of compounds which, when incorporated in high molecular plastics, yield improved sponge products with open pores.

It is a further object of the invention to provide a class of blowing agents having a higher blowing effect than the blowing agents hitherto used.

Two groups of blowing agents are generally used in the preparation of cellular materials—inorganic blowing agents and organic substances decomposing during heating to liberate gases. To the latter belong mixtures of urea and biuret, the phenylhydrazines, diazoamido benzene, azo dinitriles, dinitroso-pentamethylene tetramine, the salts of bis-(imino amino methyl) disulfide, and pent-az-diene. The compounds mentioned decompose at curing temperatures while splitting off nitrogen.

We have discovered that compounds containing the nitroso carbamide grouping

in the molecule once or several times, when incorporated and heated in high molecular plastics, are excellent blowing agents for the manufacture of sponge products.

The preferred class of compounds to be used according to our invention as blowing agents, comprises N-substituted nitroso urethans and nitroso ureas, particularly the nitroso derivatives of the corresponding polycarbamide compounds which are obtained by introducing the nitroso group into N-substituted polyurethans and polyureas.

In the general grouping (I) R stands for an alkyl or cycloalkyl radical or the corresponding alkylene radical which may be substituted by halogen, or by an aryl radical or which may contain one or several ether groups. If the molecule contains the grouping (I) twice or several times, these groups may be linked together by alkylene radicals, e. g. in the following way:

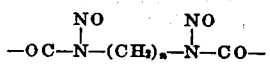

$n$ being at least two; the linkage may also be effected by ester groups, e. g. in the following way:

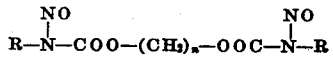

$n$ being at least two.

The chain of methylene groups may contain one or more ether groupings or halogen atoms.

The simplest possible compounds of the new class are nitroso-methyl urea, the preparation of which is described in Liebigs Annalen 253.6. (1889) having the formula:

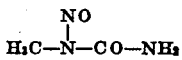

M. P. 123–124° C. and nitroso-methyl urethan having the formula:

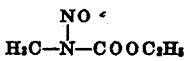

liquid.

Preferred compounds are those containing the nitroso-carbamide grouping twice, so as to get a better yield of gas.

The latter may be prepared, for example, by reacting alkylene diamines with chloro-formic esters and introducing the NO-group or by reacting glycol-bis-chloro-carbonic ester with alkylamines and introducing the NO-group, or by introducing the NO-group in dicarboxylic dialkyldiamides.

The new class of blowing agents comprises liquid or crystalline substances showing the Liebermann reaction which is characteristic for nitroso compounds. The liquid substances are yellow to flesh colored, the crystalline substances are pale yellow. They are soluble in most solvents as, for instance, in benzene, toluene, chlorobenzene, dichlorobenzene, alcohols, esters and ethers, and less soluble in aliphatic hydrocarbons. At ordinary as well as at increased temperatures they are absolutely shock-proof and stable to storing for any length of time. They decompose at temperatures above their melting points. Up to a strike of 10 m./kilogram under the drop hammer no ignition occurs. Friction tests with and without emery powder did not cause ignition or fulmination.

Table A shows the carbamide compounds and their starting materials (column 1), the melting points of the carbamide compounds (column 2), the nitroso carbamide compounds obtained from the corresponding compounds in column 1 by treating with an aqueous solution of sodium nitrite and hydrochloric acid (column 3). Column 4 contains the melting points and column 5 the decomposition points of the nitroso compounds.

*Table A*

| 1<br>Starting materials | 2<br>M. P., °C. | 3<br>treatment with nitrous acid in hydrochloric acid solution | 4<br>M. P., °C. | 5<br>decomposition point, °C. |
|---|---|---|---|---|
| Benzyl amine, HCl and potassium cyanate<br>C$_6$H$_5$—CH$_2$—NH—CO—NH$_2$ | 151 | C$_6$H$_5$—CH$_2$—N(NO)—CO—NH$_2$ | 96 | 13 |
| Benzyl amine and chloro-formic methyl ester<br>C$_6$H$_5$—CH$_2$—NH—COOCH$_3$ | liquid | C$_6$H$_5$—CH$_2$—N(NO)—COOCH$_3$ | 62 | 126 |
| Ethylene dichloro-carbonic ester and methyl amine<br>H$_3$C—NH—OC.O—(CH$_2$)$_2$—O.CO—NH—CH$_3$ | 136–138 | H$_3$C—N(NO)—OC.O—(CH$_2$)$_2$—O.CO—N(NO)—CH$_3$ | 40 | 133 |
| Diamino-dipropylether and chloro-formic methyl ester<br>H$_3$COOC—NH—(CH$_2$)$_3$—O—(CH$_2$)$_3$—NH—COOCH$_3$ | liquid | H$_3$COOC—N(NO)—(CH$_2$)$_3$—O—(CH$_2$)$_3$—N(NO)—COOCH$_3$ (red oil) | liquid | 125 |
| Ethylene diamine and chloro-formic ethyl ester<br>H$_5$C$_2$OOC—NH—(CH$_2$)$_2$—NH—COOC$_2$H$_5$ | 110 | H$_5$C$_2$OOC—N(NO)—(CH$_2$)$_2$—N(NO)—COOC$_2$H$_5$ (red oil) | liquid | 126 |
| Diamino-dipropyl ether and chloroformic ethyl ester<br>H$_5$C$_2$OOC—NH—(CH$_2$)$_3$—O—(CH$_2$)$_3$—NH—COOC$_2$H$_5$ (yellow oil) | liquid | H$_5$C$_2$OOC—N(NO)—(CH$_2$)$_3$—O—(CH$_2$)$_3$—N(NO)—COOC$_2$H$_5$ (red oil) | liquid | 131 |
| Tetramethylene-diamine and chloroformic methyl ester<br>H$_3$COOC—NH—(CH$_2$)$_4$—NH—COOCH$_3$ | 128 | H$_3$COOC—N(NO)—(CH$_2$)$_4$—N(NO)—COOCH$_3$ | 87 | 125 |
| Trimethylene diamine and chloro-formic methyl ester<br>H$_3$COOC—NH—(CH$_2$)$_3$—NH—COOCH$_3$ | liquid | H$_3$COOC—N(NO)—(CH$_2$)$_3$—N(NO)—COOCH$_3$ | liquid | 122 |

From the hitherto known blowing agents the new blowing agents are distinguished by the formation of carbon dioxide besides nitrogen during decomposition. They are further distinguished by a blowing action exceeding by far that of all known blowing agents. The gas mixture consisting of about equal parts by volume of nitrogen and carbon dioxide obviously brings about a cell structure deviating completely from that obtained when working with substances splitting off pure nitrogen. This cell-structure gives the blown products a very soft feel. Since said nitroso compounds are readily soluble in the usual organic solvents, solubility in most plastics is very good, whereby on heating an exceedingly uniform cell distribution is achieved. The blown products do not show any discoloration and are almost odorless. The decomposition products obtained are satisfactory from the physiological point of view. The new blowing agents do not influence the vulcanization accelerators usually employed.

The new blowing agents are mechanically admixed with the high polymeric plastics or their mixtures, while using when necessary the customary curing accelerators, fillers, softeners or also other blowing agents. The resultant composition is then heated to temperatures at which decomposition of the above-mentioned nitroso compounds with the evolution of gas takes place. The quantities of mono- and dinitroso compounds used may vary within wide limits, e. g. between 1–10%. They are mostly between 1–3%. High polymeric plastics include natural rubber and such synthetic plastics as are obtained by polymerization of unsaturated hydrocarbons or their substitution products. These are, for instance, synthetic rubber, polystyrene, polyvinyl chloride and copolymerizates thereof, for instance, butadiene-styrene-copolymerizates.

When using said plastics blowing is effected at temperatures above 120° C. in the presence of plasticizers, whereby with increasing quantities of plasticizers products of high plasticity are obtained, that are distinguished by low specific gravity, very uniform cell structure and very great softness.

When using rubber there may be manufactured by means of the new blowing agents besides sponges also moss rubber (a cellular rubber with partially closed cells), rubber seals and the like.

The characteristic feature of the new blowing agents consists in that relatively small quantities thereof are used for manufacturing spongy products with a very low specific gravity. It is emphasized that spongy material is obtained with very thin walls and open porous cells.

The invention is illustrated by the following examples without being restricted thereto, the parts being by weight.

*Example 1*

Into a mixture containing 65 per cent by volume of rubber consisting of the following components:

100 parts of rubber
10 parts of zinc oxide
3.5 parts of sulfur
18 parts of mineral oil
80 parts of chalk
1.5 parts of dibenzothiazyldisulfide
3 parts of stearic acid
3 parts of surface active fatty sulfonate
increasing quantities of tetramethylene dinitroso dimethyl urethan are introduced with rolling.

After curing for 35 minutes at 4 atmospheres steam overpressure (151° C.) the following increase in volume is determined:

| quantity of tetramethylene-dinitroso-dimethyl urethan | Increase in volume, percent |
|---|---|
| 0.25 part | 300 |
| 0.5 part | 500 |
| 1.0 part | 700 |
| 2.0 parts | 1,100 |
| 5.0 parts | 1,800 |

The blown material is of uniform cell structure and distinguished by great softness.

The tetramethylene - dinitroso - dimethyl urethan of the formula:

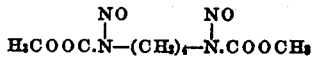

melting at 87° C. is obtained in the known manner by reacting tetramethylene diamine with chloro-formic methyl ester or from tetramethylene-diisocyanate and methanol and subsequent treatment with nitrous acid.

*Example 2*

A mixture of the following composition:

100 parts of pale rubber crepe
12 parts of zinc oxide
3.5 parts of sulfur
15 parts of mineral oil
60 parts of chalk
1.2 parts of mercapto benzothiazole
3.0 parts of stearic acid
3.0 parts of a dinitroso urethan obtained by reacting ethylene-glycol-dichloro-carbonic ester with methylamine and subsequent treatment with nitrous acid having the formula:

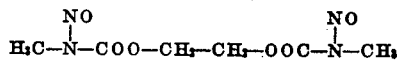

melting at 40° C. yields an increase in volume of 900% by curing under pressure and heating for 20 minutes at ½ atmosphere steam overpressure (111° C.) and 35 minutes at 3 atmospheres steam overpressure (143° C.). The blown product has open cells with exceedingly thin cell walls.

*Example 3*

A mixture consisting of:

100 parts of butadiene-styrene copolymerizate, Mooney viscosity=27 or Williams plasticity =0.13[cm.],
3.5 parts of sulfur
1.5 parts of dibenzothiazyldisulfide
1.0 part of diphenylguanidine
80 parts of chalk
18 parts of mineral oil
10 parts of zinc oxide
3 parts of stearic acid
5 parts of tetramethylene dinitroso-dimethyl urethan is cured for 35 minutes in a mold under pressure at 4 atmospheres steam overpressure (151° C.), and 2½ hours in hot air at 135° C. Increase in volume amounts to 1600%.

*Example 4*

A mixture consisting of:

100 parts of pale rubber crepe
3.5 parts of sulfur
10 parts of zinc oxide
1.5 parts of dibenzothiazyldisulfide
18 parts of mineral oil
80 parts of chalk 3 parts of stearic acid
3 parts of adipic acid dinitroso dimethylamide
yielded on curing in a mold under pressure and
heating for 35 minutes at 3 atmospheres steam
overpressure (143° C.), an increase in volume of
1000%.

The adipic acid dinitroso dimethylamide $$\underset{\text{H}_3\text{C}}{\overset{\text{NO}}{|}}\text{—N—CO—(CH}_2)_4\text{—CO—N—CH}_3\overset{\text{NO}}{|}$$

M. P. 93° C. is obtained by reacting adipic acid chloride with methylamine and subsequent treatment with nitrous acid.

Example 5

Some more tests were carried out with the nitroso carbamide compounds listed below:

Into a rubber stock of the following composition:

100 parts of pale rubber crepe
10 parts of zinc oxide
3.5 parts of sulfur
18 parts of mineral oil
80 parts of whiting
1.5 parts of dibenzothiazyl disulfide
3 parts of stearic acid
3 parts, that is 1.37% by weight, of the nitroso blowing agent are introduced with mixing. Curing takes place for 35 minutes at 4 atmospheres steam overpressure, that is 151° C.

| Blowing agent | Increase in volume, percent |
|---|---|
| $\text{CH}_3\text{—}\underset{|}{\overset{\text{NO}}{\text{N}}}\text{—CO—NH}_2$ | 700 |
| $\text{H}_2\text{N.OC—}\underset{|}{\overset{\text{NO}}{\text{N}}}\text{—(CH}_2)_4\text{—}\underset{|}{\overset{\text{NO}}{\text{N}}}\text{—CO.NH}_2$ | 900 |
| ⟨benzene⟩—$\text{CH}_2\text{—}\underset{|}{\overset{\text{NO}}{\text{N}}}\text{—COOCH}_3$ | 600 |
| $\text{H}_3\text{COOC—}\underset{|}{\overset{\text{NO}}{\text{N}}}\text{—(CH}_2)_4\text{—}\underset{|}{\overset{\text{NO}}{\text{N}}}\text{—COOCH}_3$ | 800 |
| ⟨benzene⟩—$\text{CH}_2\text{—}\underset{|}{\overset{\text{NO}}{\text{N}}}\text{—CO.NH}_2$ | 875 |
| $\text{H}_2\text{C}_2\text{OOC—}\underset{|}{\overset{\text{NO}}{\text{N}}}\text{—(CH}_2)_4\text{—}\underset{|}{\overset{\text{NO}}{\text{N}}}\text{—COOC}_2\text{H}_5$ | 800 |
| $\text{H}_3\text{COOC—}\underset{|}{\overset{\text{NO}}{\text{N}}}\text{—(CH}_2)_2\text{—O—(CH}_2)_2\text{—}\underset{|}{\overset{\text{NO}}{\text{N}}}\text{—COOCH}_3$ | 800 |

For preparation of these compounds see table A.

Example 6

Into a paste consisting of:

50 parts of polyvinyl-chloride and
50 parts of tricresyl phosphate
5 parts of tetramethylene dinitroso-dimethyl urethan are introduced with mixing in a suitable mixing apparatus. By heating the mixture to 160° C. in a sealed mold under pressure and cooling to room temperature a light weight cellular material of very low specific gravity is obtained.

Example 7

100 parts of very finely ground polystyrene are mixed with 5 parts of dinitroso tetramethylene-dimethyl-urethan in a ball mill at room temperature. The mixture is then introduced into a gas-tight mold and heated under pressure of 200–300 kilograms/cm.² to 140° C. After cooling down to about 40° C. under pressure, the molded article is removed from the mold. By exposing the latter to air of about 100–120° C. a spongy cellular light weight material of very fine cell structure having a specific gravity of 0.2 and a compressive strength of 24 kilograms/cm.² is obtained.

We claim:

1. The process which comprises incorporating tetramethylene dinitroso dimethyl urethan in a high polymeric hydrocarbon, and heating the mixture to a temperature above the decomposition point of said tetramethylene dinitroso dimethyl urethan.

2. A vulcanizable rubber composition containing as a blowing agent tetramethylene dinitroso dimethyl urethan.

3. The process which comprises incorporating an N,N'-substituted dinitroso diurethan of the formula $$\text{H}_3\text{C—OOC—}\underset{|}{\overset{\text{NO}}{\text{N}}}\text{—CH}_2\text{—CH}_2\text{—}\underset{|}{\overset{\text{NO}}{\text{N}}}\text{—COO—CH}_3$$

in a high polymeric hydrocarbon, and heating the mixture to a temperature above the decomposition point of said diurethan compound.

4. The process which comprises incorporating an N,N'-substituted dinitroso diurethan of the formula $$\text{H}_5\text{C}_2\text{—OOC—}\underset{|}{\overset{\text{NO}}{\text{N}}}\text{—CH}_2\text{—CH}_2\text{—}\underset{|}{\overset{\text{NO}}{\text{N}}}\text{—COO—C}_2\text{H}_5$$

in a high polymeric hydrocarbon, and heating the mixture to a temperature above the decomposition point of said diurethan compound.

5. A vulcanizable rubber composition containing an N,N'-substituted dinitroso diurethan of the formula $$\text{H}_3\text{C—OOC—}\underset{|}{\overset{\text{NO}}{\text{N}}}\text{—CH}_2\text{—CH}_2\text{—}\underset{|}{\overset{\text{NO}}{\text{N}}}\text{—COO—CH}_3$$

6. A vulcanizable rubber composition containing an N,N'-substituted dinitroso diurethan of the formula $$\text{H}_5\text{C}_2\text{—OOC—}\underset{|}{\overset{\text{NO}}{\text{N}}}\text{—CH}_2\text{—CH}_2\text{—}\underset{|}{\overset{\text{NO}}{\text{N}}}\text{—COO—C}_2\text{H}_5$$

7. The process which comprises incorporating an N,N'-substituted dinitroso diurethan of the general formula:

$$\text{akyl—OOC—}\underset{|}{\overset{\text{NO}}{\text{N}}}\text{—R—}\underset{|}{\overset{\text{NO}}{\text{N}}}\text{—COO—alkyl}$$

8. A vulcanizable rubber composition containing an N,N'-substituted dinitroso diurethan of the general formula:

$$\text{alkyl—OOC—}\underset{|}{\overset{\text{NO}}{\text{N}}}\text{—R—}\underset{|}{\overset{\text{NO}}{\text{N}}}\text{—COO—alkyl}$$

wherein R stands for an alkylene.

References Cited in the file of this patent

UNITED STATES PATENTS

| Number | Name | Date |
|---|---|---|
| 2,491,709 | Briggs et al. | Dec. 20, 1949 |